(12) United States Patent
Nishiyama et al.

(10) Patent No.: US 11,993,244 B2
(45) Date of Patent: May 28, 2024

(54) VEHICLE AIR-CONDITIONING CONTROL SYSTEM AND COMPUTER-READABLE STORAGE MEDIUM STORING VEHICLE AIR-CONDITIONING CONTROL PROGRAM

(71) Applicant: Toyota Jidosha Kabushiki Kaisha, Toyota (JP)

(72) Inventors: Masahiro Nishiyama, Toyota (JP); Kenji Tsukagishi, Toyota (JP); Takahisa Kaneko, Toyota (JP); Erina Kigoshi, Tokyo-to (JP); Aiko Miyamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 555 days.

(21) Appl. No.: 17/212,441

(22) Filed: Mar. 25, 2021

(65) Prior Publication Data

US 2021/0309203 A1    Oct. 7, 2021

(30) Foreign Application Priority Data

Apr. 1, 2020  (JP) ................................. 2020-065630

(51) Int. Cl.
  *B60W 10/30*    (2006.01)
  *B60H 1/00*    (2006.01)
(52) U.S. Cl.
  CPC ......... *B60W 10/30* (2013.01); *B60H 1/00642* (2013.01)

(58) Field of Classification Search
  CPC .............. B60W 10/30; B60H 1/00642; B60H 1/00771; B60H 1/00764
  See application file for complete search history.

(56) References Cited

U.S. PATENT DOCUMENTS

| 2009/0150024 | A1* | 6/2009 | Kojima | G01C 21/26 700/47 |
| 2010/0292893 | A1* | 11/2010 | Yamada | B60H 1/3208 701/36 |
| 2012/0198865 | A1* | 8/2012 | Lockwood | F24F 11/871 62/133 |
| 2014/0362347 | A1* | 12/2014 | Oel | B60K 35/00 353/13 |
| 2018/0015804 | A1 | 1/2018 | McNew | |
| 2018/0222281 | A1* | 8/2018 | Tamane | G07C 5/008 |

(Continued)

FOREIGN PATENT DOCUMENTS

| JP | 11147415 | 6/1999 |
| JP | 2000-071747 A | 3/2000 |

(Continued)

*Primary Examiner* — Sohana Tanju Khayer
(74) *Attorney, Agent, or Firm* — Dinsmore & Shohl LLP

(57) ABSTRACT

An air-conditioning control system includes an information receiver configured to communicate with a second vehicle around a first vehicle, to acquire drive source information of the second vehicle, and an air-conditioning controller configured to control an air conditioner of the first vehicle in an inside air recirculation mode or in an outside air introduction mode based on the drive source information. The drive source information includes active drive source information indicating a drive source that is currently active in the second vehicle, such that the air conditioner is controlled in accordance with the active drive source.

10 Claims, 8 Drawing Sheets

(56) References Cited

U.S. PATENT DOCUMENTS

| | | | |
|---|---|---|---|
| 2020/0356091 A1* | 11/2020 | Nagarajan | G05D 1/0088 |
| 2020/0398640 A1* | 12/2020 | Chang | B60H 1/00792 |
| 2021/0219115 A1* | 7/2021 | Ogawa | H04W 4/48 |
| 2021/0309203 A1* | 10/2021 | Nishiyama | B60W 10/30 |

FOREIGN PATENT DOCUMENTS

| | | | | |
|---|---|---|---|---|
| JP | 2009-214591 A | | 9/2009 | |
| JP | 2010-195249 A | | 9/2010 | |
| JP | 2010195249 A | * | 9/2010 | |
| JP | 2016-137818 A | | 8/2016 | |
| JP | 2017-047754 A | | 3/2017 | |

* cited by examiner

| VEHICLE ID | DRIVE SOURCE INFORMATION | POSITION INFORMATION | TRAVELING DIRECTION INFORMATION | |
|---|---|---|---|---|
| XXX11 | 00 | (X1,Y1) | NORTH | ⎫ VEHICLE INFORMATION |
| YY1123 | 02 | (X2,Y2) | NORTH | |
| X222 | 02 | (X3,Y3) | NORTH | |

VEHICLE AIR-CONDITIONING CONTROL SYSTEM AND COMPUTER-READABLE STORAGE MEDIUM STORING VEHICLE AIR-CONDITIONING CONTROL PROGRAM

CROSS REFERENCE TO RELATED APPLICATION

This application claims priority to Japanese Patent Application No. 2020-065630 filed on Apr. 1, 2020, which is incorporated herein by reference in its entirety including the specification, claims, drawings, and abstract.

TECHNICAL FIELD

The present disclosure relates to a vehicle air-conditioning control system for controlling an air conditioner of a vehicle, and to a computer-readable storage medium storing an air-conditioning control program for a vehicle.

BACKGROUND

JP 2010-195249 A discloses an air-conditioning control system of a first vehicle for specifying, from a captured image of a second vehicle ahead of the first vehicle, a size of the second vehicle, such as a large vehicle, a middle vehicle, or a small vehicle, and a distance between the first vehicle and the second vehicle and controlling the air conditioner of the first vehicle to an inside air recirculation mode or to an outside air introduction mode based on the specified size and distance. This air-conditioning control system controls the air conditioner of the first vehicle to the inside air recirculation mode in response to a small vehicle-vehicle distance, even when the preceding vehicle is a small or middle size vehicle with rather small exhaust gas emission.

SUMMARY

The air-conditioning control system disclosed in JP 2010-195249 A controls the air conditioner either to the inside air recirculation mode or to the outside air introduction mode based on the size of the preceding vehicle, on the precondition that the preceding vehicle emits exhaust gas. In recent years, however, as vehicles having a start-stop system or no-idling are commercially available and engineless vehicles such as electric vehicles are also commercially available, preceding vehicles do not always emit exhaust gas. The air-conditioning control system of JP 2010-195249 A, which fails to consider this point, may assume a preceding vehicle that actually emits no exhaust gas as a vehicle that emits exhaust gas, and control the air conditioner accordingly. As such, the air-conditioning control system disclosed in JP 2010-195249 A does not appear to control the air conditioner properly.

One or more embodiments of the disclosure are directed at providing an air-conditioning control system and an air-conditioning control program for controlling an air conditioner appropriately.

In accordance with one aspect of the disclosure, a vehicle air-conditioning control system includes an information receiver configured to communicate with at least one second vehicle around a first vehicle, to acquire drive source information of the at least one second vehicle; and an air-conditioning controller configured to control an air conditioner of the first vehicle in an inside air recirculation mode or in an outside air introduction mode based on the drive source information.

The above configuration controls the air conditioner of the first vehicle in the inside air recirculation mode or in the outside air introduction mode based on the drive source information of the second vehicle to thereby control the air conditioner in accordance the power source that is directly related to emission of exhaust gas. This configuration thus controls the air conditioner appropriately.

The drive source information may include active drive source information indicating a drive source that is working in the at least one second vehicle.

The above configuration controls the air conditioner in accordance with the drive source that is currently active and therefore controls the air conditioner in response to whether or not the engine of the second vehicle is operating, that is, whether or not the second vehicle is emitting exhaust gas. This configuration thus controls the air conditioner appropriately.

The drive source information may include mounted drive source information indicating a drive source mounted in the at least one second vehicle.

The above configuration controls the air conditioner in accordance with the drive source mounted in the second vehicle and therefore controls the air conditioner in response to the possibility of the second vehicle being operated by an engine; that is, the possibility of the second vehicle emitting exhaust gas. This configuration thus controls the air conditioner appropriately.

The air-conditioning controller may control the air conditioner in the inside air recirculation mode in response to the drive source information indicating an engine. The above configuration controls the air conditioner to the inside air recirculation mode in response to emission of exhaust gas or the possibility of emission of exhaust gas by the at least one second vehicle, thereby preventing entry of exhaust gas into the vehicle. This configuration thus controls the air conditioner appropriately.

The vehicle air-conditioning control system may further include a vehicle identifier configured to identify the at least one second vehicle located windward of the first vehicle, and the air-conditioning controller may control the air conditioner in the inside air recirculation mode or in the outside air introduction mode, based on the drive source information of the at least one second vehicle located windward of the first vehicle.

The first vehicle is affected by the exhaust gas emitted from the second vehicle that is located windward of the first vehicle. The above configuration controls the air conditioner to the inside air recirculation mode or the outside air introduction mode based on the drive source information of the second vehicle located windward of the first vehicle, thereby controlling the air conditioner appropriately.

The at least one second vehicle may include a plurality of second vehicles, and the information receiver may acquire the drive source information from each of the plurality of second vehicles around the first vehicle. The air-conditioning controller may control the air conditioner in the inside air recirculation mode or in the outside air introduction mode, in response to the drive source information from each of the plurality of second vehicles satisfying a predetermined criterion.

The above configuration controls the air conditioner in accordance with the drive sources of the plurality of second vehicles around the first vehicle, thereby controlling the air conditioner appropriately.

The air-conditioning controller may maintain the outside air introduction mode of the air conditioner in response to a defroster in operation and the air conditioner in the outside air introduction mode, in spite of the drive source information indicating an engine.

The above configuration prevents a reduction in the defrosting effects caused by a mode change to the inside air recirculation mode.

The information receiver may acquire the drive source information through vehicle-to-vehicle communication between the first vehicle and the at least one second vehicle.

The above configuration enables the information receiver to acquire the drive source information not through a server, for example, to thereby acquire the drive source information quickly.

The vehicle air-conditioning control system may be disposed external to the first vehicle and the at least one second vehicle, and the information receiver may acquire position information from each of a plurality of vehicles including the first vehicle, identify a vehicle located around the first vehicle as the at least one second vehicle based on the position information that is acquired, and acquire the drive source information of the at least one second vehicle that is identified.

The above configuration controls the air conditioner based on the drive source information externally of the vehicle, to thereby reduce the processing load for control of the air conditioner within the vehicle.

In accordance with another aspect of the disclosure, a computer-readable storage medium is a non-transitory computer-readable storage medium storing a vehicle air-conditioning control program. The vehicle air-conditioning control program causes a processor of a computer to execute operations including communicating with a second vehicle around a first vehicle to acquire drive source information of the second vehicle, and controlling the air conditioner of the first vehicle in an inside air recirculation mode or in an outside air introduction mode based on the drive source information. Such a computer-readable storage medium may be a non-volatile memory.

The above configuration controls the air conditioner of the first vehicle to the inside air recirculation mode or to the outside air introduction mode based on the drive source information of the second vehicle, enabling control of the air conditioner in accordance with the drive source directly related to emission of exhaust gas. This configuration thus controls the air conditioner appropriately.

The present disclosure provides an air-conditioning control system and an air-conditioning control program for controlling the air conditioner appropriately.

BRIEF DESCRIPTION OF DRAWINGS

Embodiment(s) of the present disclosure will be described based on the following figures, wherein.

DESCRIPTION OF EMBODIMENTS

A vehicle air-conditioning control system according to embodiments of the disclosure will be described by reference to the drawings.

Figure 1:
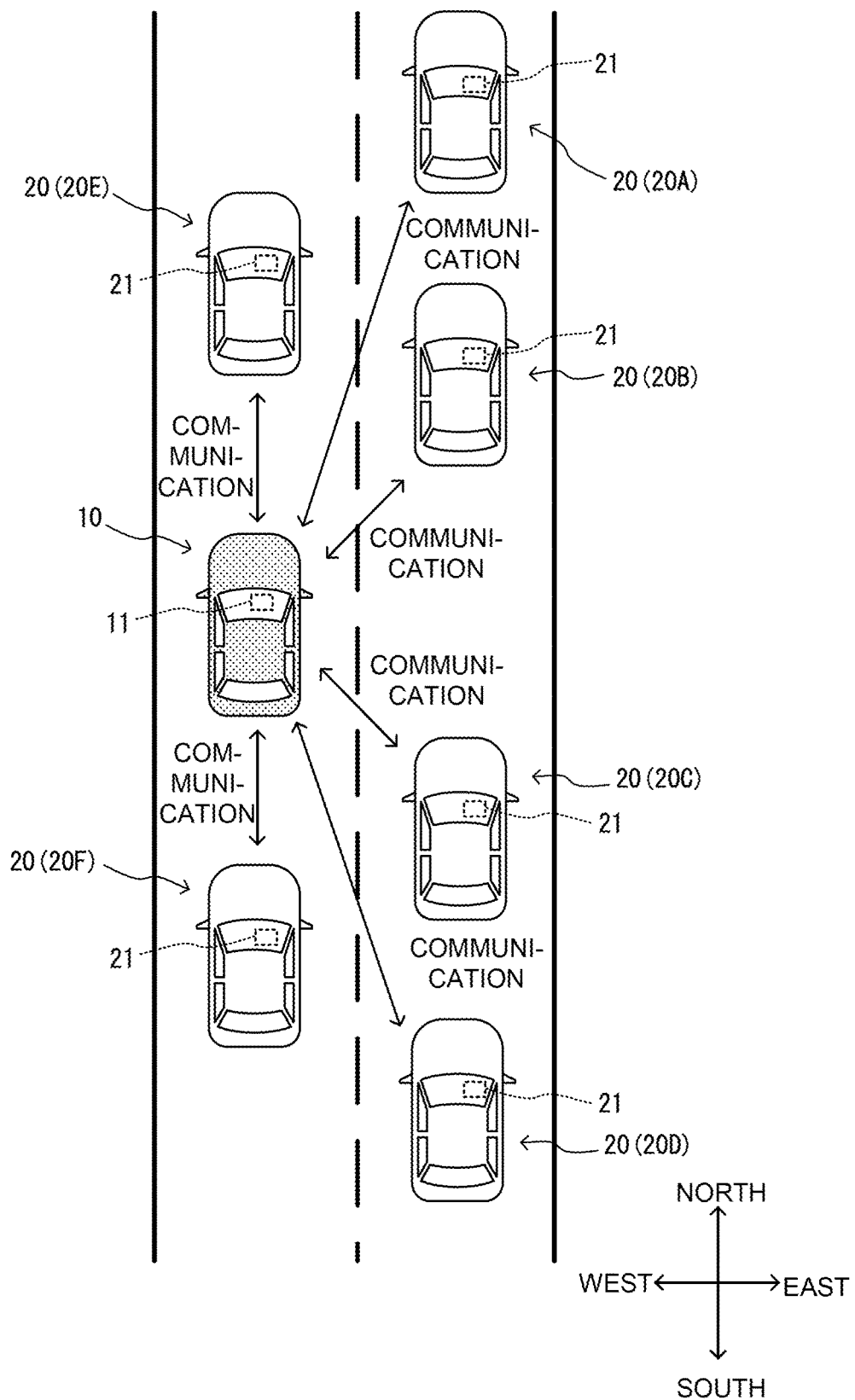
FIG. 1 is a top view illustrating a first vehicle including an air-conditioning control system according to an embodiment of the disclosure and second vehicles.

As illustrate in FIG. 1, an air-conditioning control system 11 according to an embodiment is mounted in a first vehicle 10. The air-conditioning control system 11 communicates with an air-conditioning control system 21 mounted in each of second vehicles 20 around the first vehicle. In other words, the air-conditioning control system 11 is in vehicle-to-vehicle communication with each of the air-conditioning control systems 21. In the example illustrated in FIG. 1, the air-conditioning control system 11 communicates with six second vehicles 20, 20A to 20F. The air-conditioning control system 11 controls an air conditioner 12 (see FIG. 2) for air-conditioning the interior of the first vehicle 10, based on drive source information, which will be described below, acquired through vehicle-to-vehicle communication.

Figure 2:
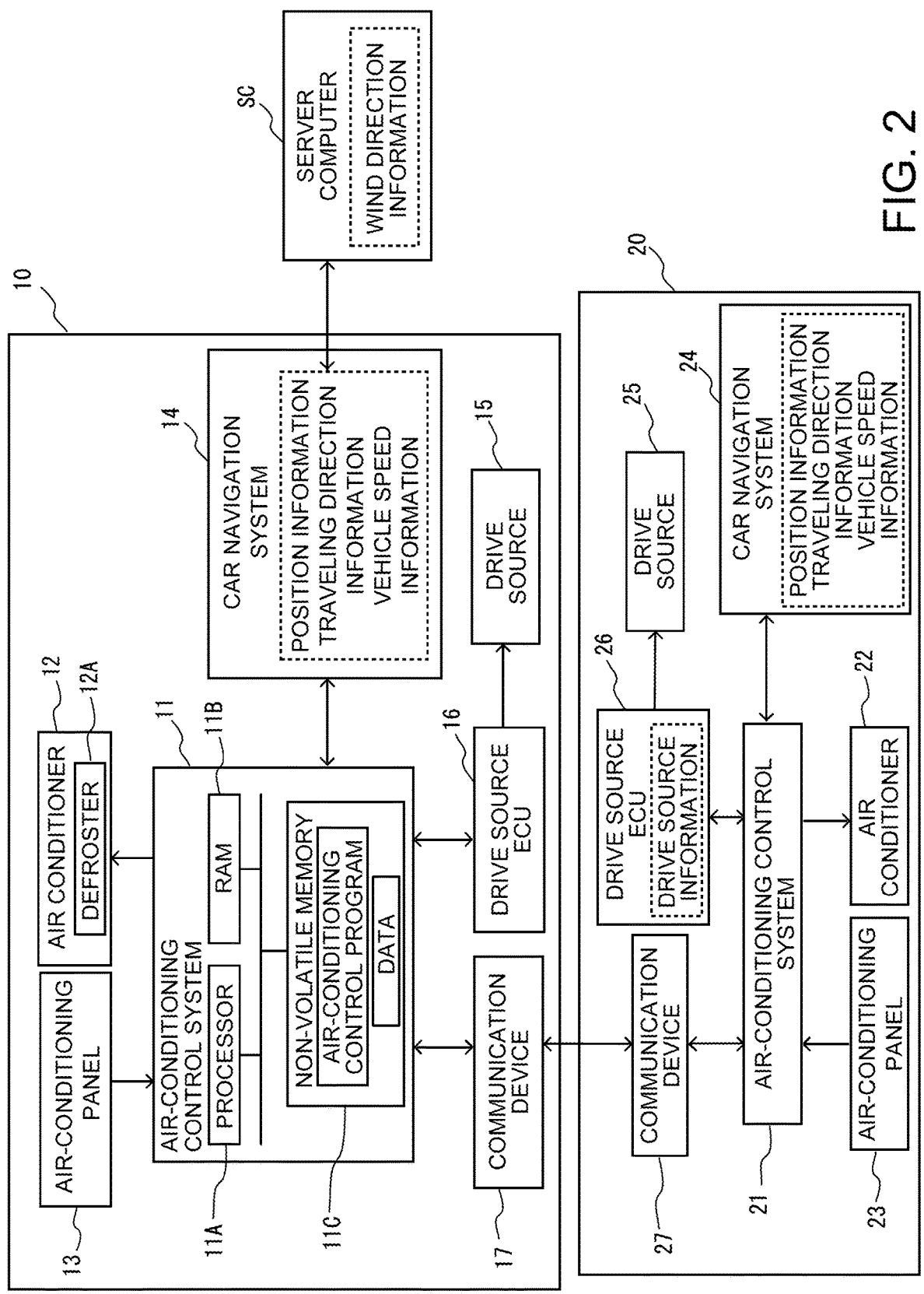
FIG. 2 is a block diagram illustrating configurations of the first vehicle and the second vehicle illustrated in FIG. 1.

As illustrated in FIG. 2, the first vehicle 10 includes, in addition to the air-conditioning control system 11 and the air conditioner 12, an air-conditioning panel 13 for manipulating the air conditioner 12, and a car navigation system 14 having a navigation function. The first vehicle 10 further includes a drive source 15 that provides driving force to drive the first vehicle 10, a drive source ECU (Electronic Control Unit) 16 that electronically controls the drive source 15, and a communication device 17 for use in the vehicle-to-vehicle communication described above.

The air-conditioning control system 11 includes a computer, such as an air-conditioning ECU that controls operation of the air conditioner 12. The air-conditioning control system 11 includes a processor 11A, a RAM (Random access memory) 11B that functions as a main memory of the processor 11A, and a non-volatile memory 11C that stores an air-conditioning control program and data that is executed or used by the processor 11A.

The processor 11A may be a CPU (Central Processing Unit), for example. The processor 11A may be a one-chip device including the RAM 11B. The non-volatile memory 11C includes at least one of a flash memory, a hard disk, an SSD (Solid State Drive), and a ROM (Read Only Memory), for example.

The processor 11A executes the air-conditioning control program stored in the non-volatile memory 11C and uses the data stored in the non-volatile memory 11C to thereby actually control the operations of the air conditioner 12 by the air-conditioning control system 11. The processing performed by the processor 11A; that is, the operations of the air-conditioning control system 11, will be described below.

The air-conditioning control system 11 communicates, via input and output ports which are not shown, with the air conditioner 12, the air-conditioning panel 13, the car navigation system 14, the drive source ECU 16, and the communication device 17.

The air conditioner 12 has cooling function and heating function. The air conditioner 12 may operate in an outside air introduction mode in which the outside air is introduced into the vehicle interior of the first vehicle 10 or in an inside air recirculation mode in which the air within the vehicle interior is recirculated without introducing the outside air into the vehicle interior of the first vehicle 10. The air conditioner 12 further includes a defroster 12A that defrosts the windshield.

The air-conditioning panel 13 includes a touch panel or various operation switches that receive manipulations of a passenger of the first vehicle 10 to control the air conditioner 12. The air-conditioning panel 13 provides manipulation information indicative of the received manipulations to the air-conditioning control system 11. The air-conditioning control system 11, based on the provided manipulation information, operates the air conditioner 12. Specifically, the air-conditioning control system 11, based on the manipulation information, causes the air conditioner 12 to operate as a cooler or a heater. The air-conditioning control system 11, based on the manipulation information, further causes the air conditioner 12 to operate in either the outside air introduction mode or the inside air recirculation mode. The air-conditioning control system 11, based on the manipulation information, operates the defroster 12A.

The car navigation system 14 has function of a typical navigation system. The car navigation system 14 acquires, from a GPS (Global Positioning System), for example, position information that indicates the position of the first vehicle 10 with latitude and longitude, and traveling direction information that indicates the traveling direction of the first vehicle 10 by a direction. The car navigation system 14 further includes a communication device for a telematics service such as a DCM (Data Communication Module), and uses the communication device to acquire, from a server computer SC external to the first vehicle 10, wind direction information indicating, with a direction, the direction of wind at a location of the first vehicle 10. The car navigation system 14 further acquires vehicle speed information indicative of the vehicle speed of the first vehicle 10.

The drive source 15 provides driving force to drive the first vehicle 10. The drive source 15 is an engine for an engine vehicle, an engine and an electric motor for a hybrid vehicle, and an electric motor for an electric vehicle or a fuel cell vehicle.

The drive source ECU 16, similar to the air-conditioning control system 11, includes a computer, for example, and electronically controls operation of the drive source 15.

The communication device 17 is a communication module that complies with standards for vehicle-to-vehicle communication, for example, and includes an antenna, a modulation circuit, and a demodulation circuit, for example. The communication device 17 modulates or demodulates information exchanged through vehicle-to-vehicle communication between the air-conditioning control system 11 of the first vehicle 10 and the air-conditioning control system 21 of the second vehicle 20.

The second vehicle 20 has a configuration similar to that of the first vehicle 10. Specifically, the second vehicle 20 includes an air-conditioning control system 21, an air conditioner 22, an air-conditioning panel 23, a car navigation system 24, a drive source 25, a drive source ECU 26, and a communication device 27, which are basically the same as the corresponding devices 11 to 17 of the first vehicle 10. The car navigation system 24 acquires position information and traveling direction information, for example, of the second vehicle 20.

Figure 3:
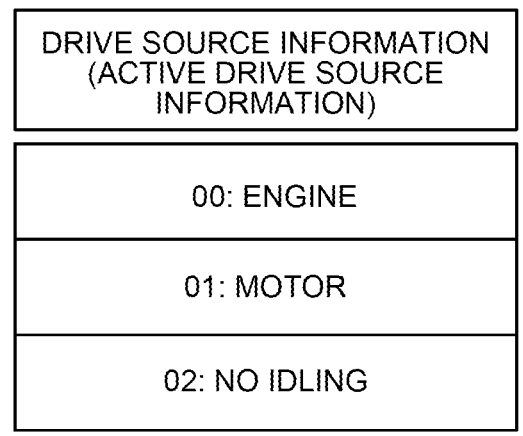
FIG. 3 illustrates a content of active drive source information.

The drive source ECU 26 stores drive source information indicating the drive source of the second vehicle 20. The drive source information as used herein refers to active drive source information indicating the drive source that is working in the second vehicle 20. As illustrated in FIG. 3, the active drive source information indicates the active drive source, with one of numerical values "00", "01", and "02". The active drive source that is indicated with "00" is an engine and the active drive source that is indicated with "01" is an electric motor. The numerical value "02" indicates that the engine is in a no-idling condition; that is, no drive source is under operation. The drive source information is stored and managed by the drive source ECU 26. The RAM, for example, of the drive source ECU 26 includes a storage region that stores the drive source information, and the drive source ECU 26 updates numerical values of the drive source information stored in the storage region in response to a change of control for the drive source 25.

Figure 4:
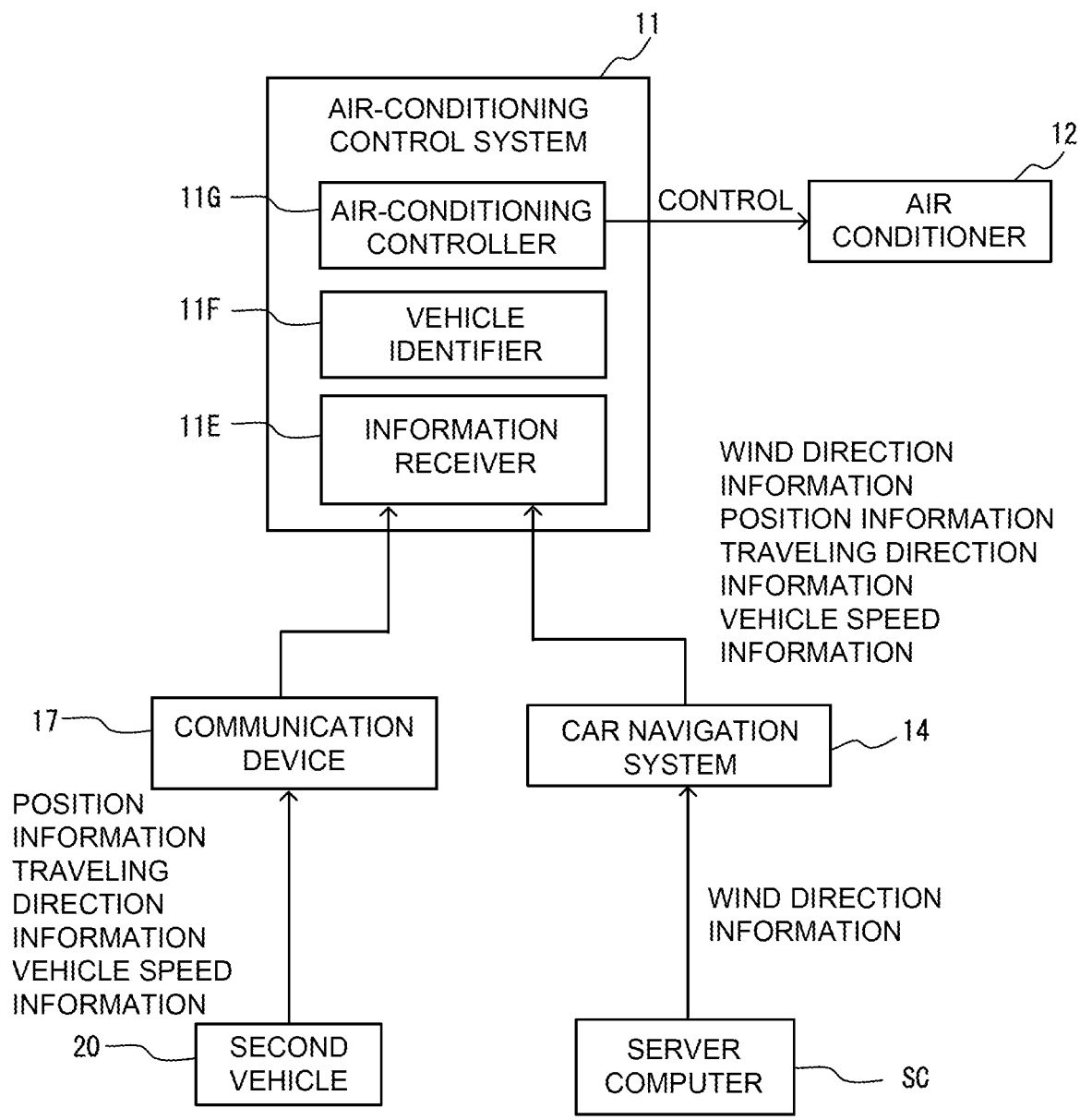
FIG. 4 is a block diagram illustrating a configuration of the air-conditioning control system and other components.

The operation of the air-conditioning control system 11 will be described. In the air-conditioning control system 11, the processor 11A executes the air-conditioning control program to operate as an information receiver 11E, a vehicle identifier 11F, and an air-conditioning controller 11G illustrated in FIG. 4 for controlling the air conditioner 12. The information receiver 11E acquires drive source information from the second vehicles 20 and acquires position information of the first vehicle 10 from the car navigation system 14. The vehicle identifier 11F, based on the position information of the second vehicles 20 acquired by the information receiver 11E, identifies, from among the second vehicles 20, second vehicles 20 located ahead or on the windward side of first vehicle 10. The air-conditioning controller 11G, based on the drive source information of the second vehicles 20 identified by the vehicle identifier 11F, controls the air conditioner 12 to the outside air introduction mode or to the inside air recirculation mode.

Figure 5:
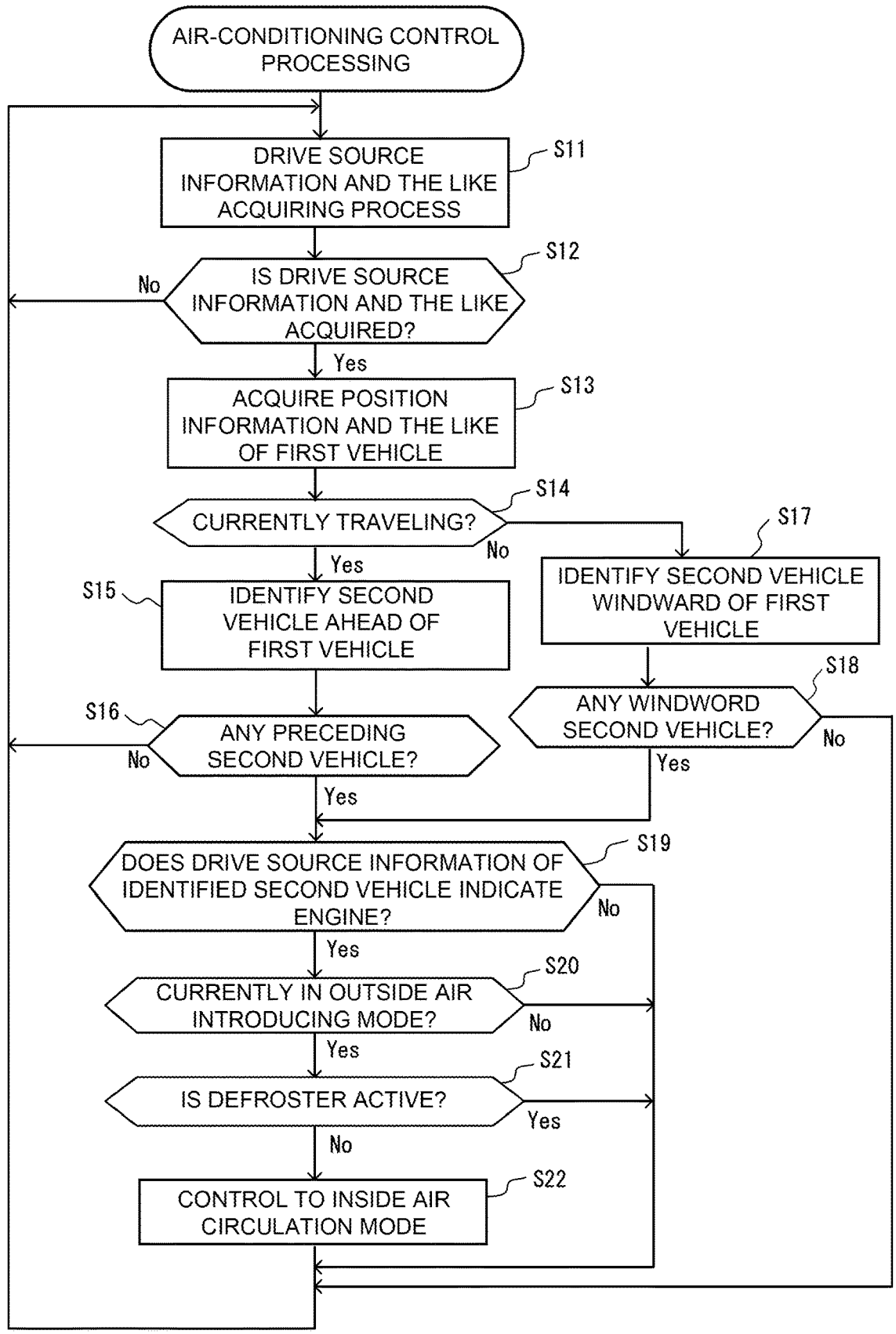
FIG. 5 is a flowchart of air-conditioning control processing executed by the air-conditioning control system.

The information receiver 11E, the vehicle identifier 11F, and the air-conditioning controller 11G execute the air-conditioning control processing illustrated in FIG. 5 in collaboration, thereby operating as described above. To execute the air-conditioning control processing illustrated in FIG. 5, first, the information receiver 11E executes an acquisition process for acquiring the drive source information, the position information, and the traveling direction information (hereinafter, these information items will be referred to as "drive source information and the like") of the second vehicles 20 located around the first vehicle 10 (Step S11).

In step S11, the information receiver 11E outputs a request for transmitting the drive source information and the like, for example, via the communication device 17. When any second vehicles 20 are around the first vehicle 10, the transmission request is supplied to the air-conditioning control system 21 of each of the second vehicles 20, via the communication device 27. The air-conditioning control system 21, upon receiving the transmission request, acquires from the car navigation system 24 the position information and the traveling direction information indicative of the current position and the current traveling direction of the second vehicle 20, respectively. The air-conditioning control system 21 further acquires, from the drive source ECU 26, the drive source information indicative of the current drive source of the second vehicle 20.

The air-conditioning control system 21 returns the drive source information and the like thus acquired, with vehicle IDs of the second vehicles 20, to the information receiver 11E of the air-conditioning control system 11, via the communication device 27 and the communication device 17. The vehicle ID; that is, information that identifies each second vehicle 20, is prestored in the air-conditioning control system 21. The information receiver 11E receives the reply from the air-conditioning control system 21 described above, to thereby acquire the drive source information and the like of each of the second vehicles 20. The information receiver 11E records the acquired drive source information and the like in the RAM 11B in association with each vehicle ID. A set of the vehicle ID and the drive source information and the like will also be referred to as vehicle information of the second vehicle 20.

Figures 6, 7:
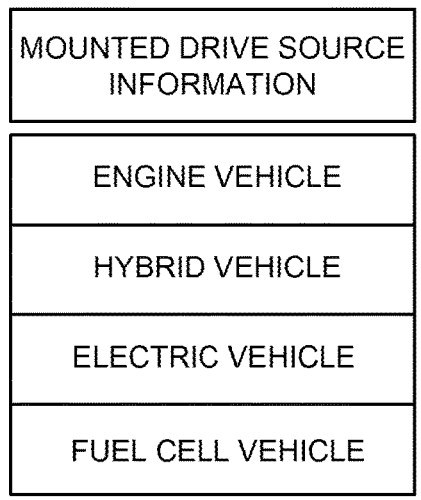
FIG. 6 illustrates a content of vehicle information acquired by an information receiver of the information air-conditioning control system and stored in a RAM.
FIG. 7 illustrates mounted drive source information.

When a plurality of second vehicles 20 are around the first vehicle 10, the information receiver 11E acquires the vehicle information from each of the second vehicles 20 and stores the information in the RAM 11B. The information receiver 11E thus acquires one or more vehicle information items and stores the vehicle information items in the RAM 11B. FIG. 6 illustrates example vehicle information stored in the RAM 11B. In the position information of the vehicle information, X1, X2, and X3 denote longitude, and Y1, Y2, and Y3 denote latitude.

The information receiver 11E then determines whether or not the drive source information and the like is acquired in step S11 (step S12). If the drive source information and the like is not acquired (No in step S12), this means that there are no second vehicles 20 around the first vehicle 10, and the information receiver 11E executes the process in step S11 once again.

If one or more second vehicles 20 are around the first vehicle 10, and the information receiver 11E acquires the drive source information and the like (Yes in step S12), the information receiver 11E acquires the current position information, the traveling direction information, and the vehicle speed information of the first vehicle 10, and the wind direction information, from the car navigation system 14 (step S13).

After step S13, the vehicle identifier 11F starts the processing. Specifically, the vehicle identifier 11F determines whether or not the first vehicle 10 is currently traveling (step S14). The vehicle identifier 11F determines that the first vehicle 10 is traveling when the vehicle speed indicated by the vehicle speed information is greater than 0 (Yes in step S14).

In response to the determination that the first vehicle 10 is traveling (Yes in step S14), the vehicle identifier 11F identifies, from among the second vehicles 20 around the first vehicle 10, a second vehicle 20 traveling ahead of the first vehicle 10 within a predetermined distance from the first vehicle 10, which is the second vehicle 20E in the example illustrated in FIG. 1 (step S15). In step S15, the vehicle identifier 11F identifies, from among the vehicle information of the one or more second vehicles 20 stored in the RAM 11B, vehicle information including the traveling direction information of the second vehicle 20 indicating the same traveling direction as the traveling direction information of the first vehicle 10, and the position information of the second vehicle 20 indicating a position within a predetermined range from the position indicated by the position information of the first vehicle 10 toward the traveling direction of the second vehicle 20. Identification of this vehicle information allows identification of one or more preceding second vehicles 20 ahead of the first vehicle 10 corresponding to the vehicle information.

The vehicle identifier 11F then determines whether or not there are such preceding second vehicles 20 (step S16). In response to the determination that no vehicle information matches the above conditions and therefore no preceding second vehicles 20 are identified, it is determined that there are no second vehicles 20 ahead of the first vehicle 10 (No in step S16). In response to this determination, the information receiver 11E executes the process in step S11 once again.

If it is determined that the first vehicle 10 is not traveling (No in step S14), the vehicle identifier 11F identifies, based on the wind direction information acquired in step S13, second vehicles 20 located within a predetermined range to the windward of the first vehicle 10, from among the second vehicles 20 around the first vehicle (step S17). When the wind direction information indicates northeast, the second vehicle 20 corresponds to the second vehicle 20B in the example illustrated in FIG. 1. In step S17, the vehicle identifier 11F identifies, from among the vehicle information of one or more second vehicles 20 stored in the RAM 11B, vehicle information including the position information of the second vehicle 20 indicating a position within a predetermined range to the windward indicated by the wind direction information from the position indicated by the position information of the first vehicle 10. Identification of this vehicle information allows identification of one or more second vehicles 20 located windward of the first vehicle 10 corresponding to the vehicle information. The wind direction information may indicate a wind speed or a windless state. When the wind direction information indicates gentle breeze with the wind speed of a predetermined reference value or lower or indicates a windless state, the vehicle identifier 11F identifies, as the second vehicle 20 located windward of the first vehicle 10 described above, a second vehicle 20 located within a predetermined circle range about the first vehicle, from among the second vehicles 20 around the first vehicle 10.

The vehicle identifier 11F then determines whether or not there are the second vehicles 20 on the windward side (step S18). If it is determined that no vehicle information matches the above conditions and therefore no windward second vehicles 20 are identified, the vehicle identifier 11F determines that there are no second vehicles 20 on the windward side (No in step S18). In response to this determination, the information receiver 11E executes the process in step S11 once again.

In response to completion of the identification in step S15 or S17 and to the presence of the preceding second vehicles 20 or the windward second vehicles 20 described above (Yes in step S16 or Yes in step S18), the air-conditioning controller 11G determines whether or not the drive source information contained in the vehicle information of at least one of the one or more second vehicles 20 identified by the vehicle identifier 11F indicates an engine (step S19). In this example, the air-conditioning controller 11G specifically determines whether or not the numerical value of the drive source information is "00".

If it is determined that at least one drive source information indicates an engine (Yes in step S19), the air-conditioning controller 11G determines whether or not the air conditioner 12 is currently operating in the outside air introduction mode (step S20). If the air conditioner 12 is currently in the outside air introduction mode (Yes in step S20), the air-conditioning controller 11G further determines whether or not the defroster 12A of the air conditioner 12 is currently working (step S21). If it is determined that the defroster 12A is active (No in step S21), the air-conditioning controller 11G controls the air conditioner 12 in the inside air recirculation mode (step S22). The inside air recirculation mode prevents entry of the exhaust gas from the second vehicle 20 into the vehicle interior of the first vehicle 10.

After elapse of a predetermined time from step S22, for example, the information receiver 11E executes the process in step S11.

If it is determined that none of the drive source information indicates an engine (No in step S19), that the air conditioner 12 is not in the outside air introduction mode (No in step S20), or that the defroster 12A is active (Yes in step S21), the information receiver 11E executes the process in step S11 once again.

The state around the first vehicle 10; that is, the arrangement of the second vehicles 20, for example, does not change instantaneously. Therefore, a standby time having a predetermined time length may be provided before the information receiver 11E executes the process in step S11 once again in response to the results of determination in the process steps S12, S16, S18, and S19 to S21.

The air-conditioning control processing described above controls the air conditioner 12 in the inside air recirculation mode, when the drive source information from the second vehicle 20 ahead of the first vehicle 10 indicates that the preceding second vehicle 20 is operating by an engine, while the first vehicle 10 is traveling. As the first vehicle 10 that is traveling is against the wind, the exhaust gas from the second vehicle 20 ahead of the first vehicle 10 matters more than does the exhaust gas from the second vehicle 20 on the side and back of the first vehicle 10. The air-conditioning control processing described above controls the air conditioner 12 in the inside air recirculation mode when it is determined that the engine of the preceding second vehicle 20 is operating while the first vehicle 10 is traveling, to effectively prevent entry of the exhaust gas into the vehicle interior of the first vehicle 10.

The air-conditioning control processing described above further controls the air conditioner 12 in the inside air recirculation mode when the drive source information from the second vehicle 20 located windward of the first vehicle 10 indicates that the engine of the second vehicle 20 is operating, while the first vehicle 10 is stopped, not traveling. When the first vehicle 10 stops, whether or not the exhaust gas from the second vehicles 20 around the first vehicle 10 is directed toward the first vehicle 10 is determined depending on the wind direction, for example. The air-conditioning control processing described above controls the air conditioner 12 to the inside air recirculation mode when the engine of the second vehicle 20 located windward of the first vehicle 10 that is stopped is operating, to thereby effectively prevent entry of the exhaust gas into the vehicle interior of the first vehicle 10.

The air-conditioning control processing described above does not control the air conditioner in the inside air recirculation mode when the engine of the second vehicle 20 is not operating while the first vehicle 10 is traveling. The air-conditioning control processing also does not control the air conditioner in the inside air recirculation mode when the engine of the second vehicle 20 located windward of the first vehicle 10 is not operating while the first vehicle 10 is stopped. Further, control to the inside air recirculation mode is not triggered by the determination that the drive source 25 of the second vehicle 20 other than the preceding vehicle is an engine while the first vehicle 10 is traveling or by the determination that the drive source 25 of the second vehicle 20 other than the windward second vehicle 20 is an engine while the first vehicle 10 is stopped. The air-conditioning control processing thus reduces the possibility of control to the inside air recirculation mode in response to unnecessary situations.

The air-conditioning control processing further maintains the outside air introduction mode in response to the determination that the defroster 12A is active and the air conditioner 12 is operating in the outside air introduction mode while the engine of the preceding second vehicle 20 or the windward second vehicle 20 is operating. This prevents lowering of the defrosting effect of the defroster 12A caused by control to the inside air recirculation mode.

As described above, the air-conditioning control system 11 includes the information receiver 11E that communicates with the second vehicles 20 around the first vehicle 10 to acquire the drive source information of the second vehicles 20, and the air-conditioning controller 11G that controls the air conditioner 12 in the inside air recirculation mode or in the outside air introduction mode based on the drive source information. Controlling the air conditioner 12 in the inside air recirculation mode or in the outside air introduction mode includes maintaining the air conditioner 12 in the inside air recirculation mode or in the outside air introduction mode, such as maintaining the outside air introduction mode in response to the negative determination in step S19 in FIG. 5, for example. This configuration controls the air conditioner of the first vehicle in the inside air recirculation mode or in the outside air introduction mode based on the drive source information of the second vehicle, to thereby enable control of the air conditioner 12 in response to the drive source 25 of the second vehicle 20 that is directly relevant to emission of the exhaust gas. The air-conditioning control system 11 therefore controls the air conditioner 12 properly.

The drive source information includes the active drive source information indicative of the drive source 25 that is working in the second vehicle 20, and the air conditioner 12 is controlled in accordance with the drive source 25 that is currently active. The air conditioner 12 is therefore controlled in accordance with whether or not the engine is currently operating in the second vehicle 20; that is, whether or not the second vehicle 20 is emitting the exhaust gas. The air-conditioning control system 11 thus controls the air conditioner 12 appropriately.

The drive source information may include, in addition to or in place of the active drive source information, mounted drive source information indicative of the drive source 25 mounted on the second vehicle 20. The mounted drive source information indicates the drive source 25 mounted on the second vehicle 20 by indicating a type of the vehicle, such as an engine vehicle, a hybrid vehicle, an electric vehicle, or a fuel cell vehicle, for example, as illustrated in FIG. 7. The engine vehicle indicates that the drive source 25 mounted in the second vehicle 20 is an engine. The hybrid vehicle indicates that the drive source 25 is an engine or an electric motor, and the electric vehicle and the fuel cell vehicle indicate that the drive source 25 is an electric motor. The mounted drive source information is stored in any device such as the air-conditioning control system 21 or the drive source ECU 26, for example, and is supplied from the second vehicle 20 to the air-conditioning control system 11 of the first vehicle 10. When in step S19 it is determined that the drive source 25 is an engine, based on the mounted drive source information indicating an engine vehicle or a hybrid vehicle, the air-conditioning controller 11G may proceed to step S20 in response to this determination as an affirmative determination result. The air-conditioning controller 11G may perform determination in step S19 based on the active drive source information when the drive source information includes both the mounted drive source information and the active drive source information. The air-conditioning controller 11G may proceed to step S20 in response to the mounted drive source information and the active drive source information both indicating an engine in step S19. The mounted drive source information is thus used to enable control of the air conditioner 12 of the first vehicle 10 based on the drive source 25 mounted on the second vehicle 20. This enables control of the air conditioner 12 in accordance with the possibility that the second vehicle 20 is operating by an engine; that is, the possibility of emission of exhausted gas by the second vehicle, thereby controlling the air conditioner 12 appropriately.

The air-conditioning controller 11G controls the air conditioner in the inside air recirculation mode when the drive source information of the second vehicle 20 indicates an engine. This enables control of the air conditioner 12 in the inside air recirculation mode when the second vehicle 20 is emitting or can emit the exhaust gas, thereby preventing entry of the exhaust gas into the first vehicle 10 and appropriately controlling the air conditioner 12.

The air-conditioning controller 11G does not control the air conditioner 12 in the inside air recirculation mode when the drive source information does not indicate an engine. This prevents control of the air conditioner 12 in the inside air recirculation mode when the second vehicle 20 is not emitting the exhaust gas, thereby appropriately controlling the air conditioner 12. The air-conditioning controller 11G may not only maintain the air conditioner 12 operating in the outside air introduction mode when the air conditioner 12 operates in the outside air introduction mode and the drive source information does not indicate an engine, but also may control the air conditioner 12 in the outside air introduction mode when the air conditioner 12 operates in the inside air recirculation mode and the drive source information does not indicate an engine. This actively introduces the outside air into the first vehicle 10.

The vehicle identifier 11F identifies the second vehicle 20 located windward of the first vehicle 10, and the air-conditioning controller 11G, based on the drive source information from the windward second vehicle 20, controls the air conditioner 12 in the inside air recirculation mode or in the outside air introduction mode. The first vehicle 10 is affected by the exhaust gas emitted from the second vehicle 20 that is located windward of the first vehicle 10. This configuration uses the drive source information from the second vehicle 20 located windward of the first vehicle 10 to control the air conditioner 12 to the inside air recirculation mode or the outside air introduction mode, thereby appropriately controlling the air conditioner 12.

The information receiver 11E acquires the drive source information from each of the second vehicles 20 around the first vehicle 10, particularly the second vehicles 20 located ahead or windward of the first vehicle 10, and the air-conditioning controller 11G controls the air conditioner 12 in the inside air recirculation mode or in the outside air introduction mode in response to the drive source information from each of the second vehicles 20 ahead or windward of the first vehicle 10 satisfying a predetermined condition. This configuration enables control of the air conditioner 12 based on the drive sources 25 of the second vehicles 20 around the first vehicle 10, thereby appropriately controlling the air conditioner 12. In this embodiment, the predetermined condition may include that the drive source information from at least one of the second vehicles 20 located ahead or windward of the first vehicle 10 indicates an engine; that is, that at least one of the second vehicles 20 includes an engine as a drive source, or other conditions. For example, the predetermined condition may include a condition that the drive source information of at least a predetermined threshold number; that is, two or more, of the second vehicles 20 indicates an engine. The predetermined condition may be any predetermined condition. For example, the condition may be that satisfying that condition while the air conditioner 12 is operating in the outside air introduction mode would trigger entry of the exhaust gas from the second vehicle 20 around the first vehicle 10 into the vehicle interior of the first vehicle 10.

When the defroster 12A is active and the air conditioner 12 is operating in the outside air introduction mode, the air-conditioning controller 11G maintains the outside air introduction mode in spite of the drive source information indicating an engine. This prevents lowering the defrosting effect of the defroster caused by a change to the inside air recirculation mode.

The information receiver 11E acquires the drive source information through vehicle-to-vehicle communication between the first vehicle 10 and the second vehicle 20. This enables the information receiver 11E to acquire the drive source information directly through wireless communication not via a device other than the first vehicle 10 and the second vehicle 20, such as a server, and to therefore acquire the drive source information quickly.

Figure 8:
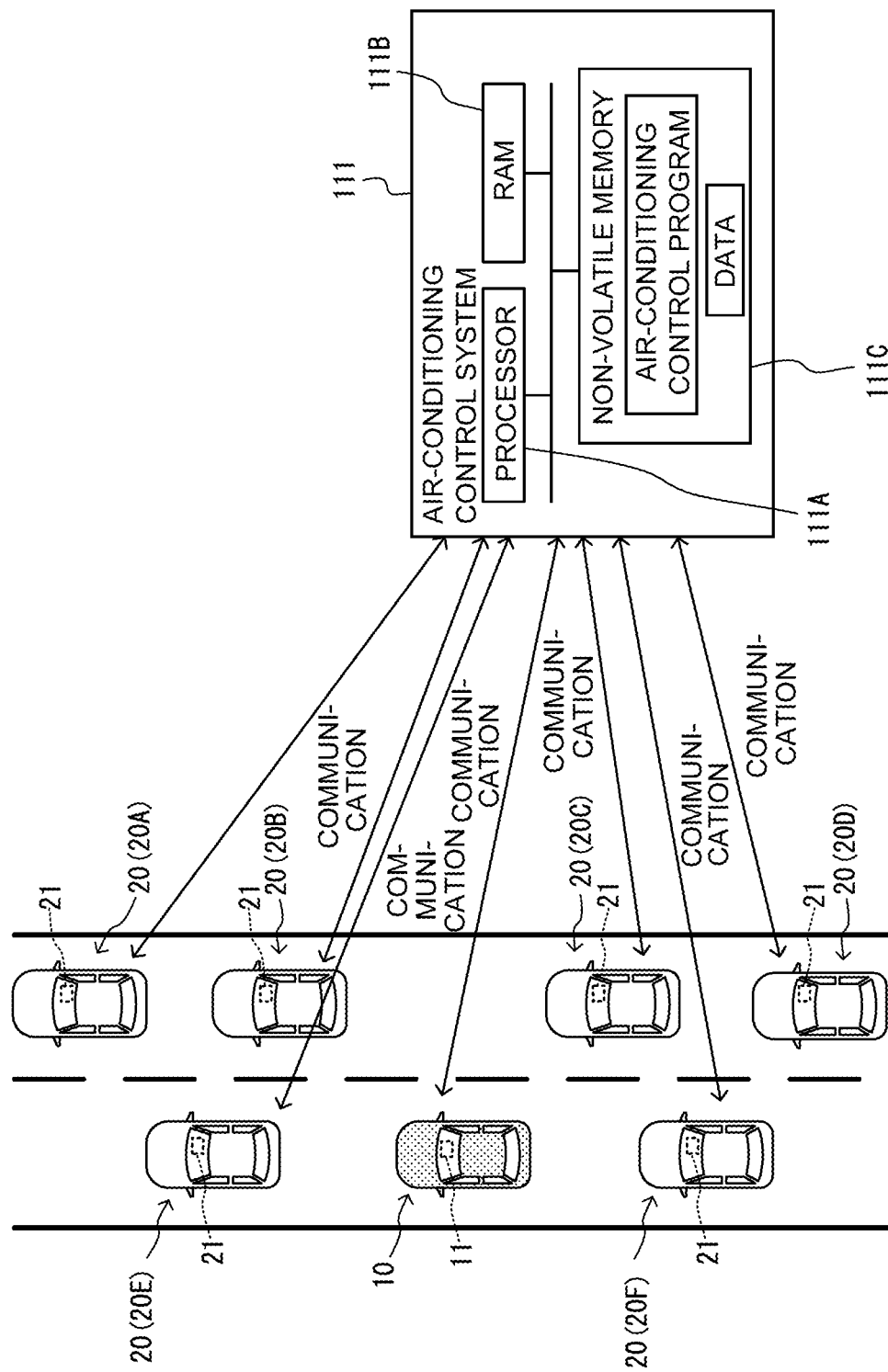
FIG. 8 illustrates an air-conditioning control system and the like according to a modified embodiment.
Figure 9:
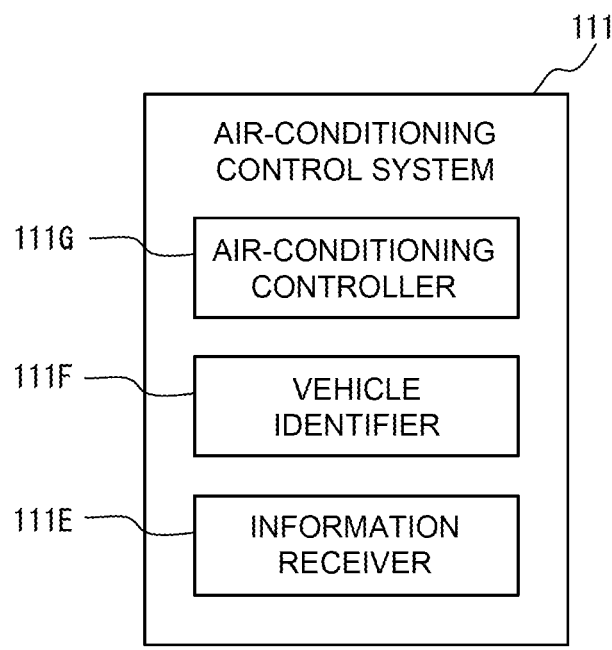
FIG. 9 is a block diagram illustrating a configuration of the air-conditioning control system in FIG. 8.

The air-conditioning control system 11 may be an air-conditioning control system 111 including a server computer that is capable of communication with the exterior of the first vehicle 10 and the second vehicle 20 and with the first vehicle 10 and the second vehicle 20, as illustrated in FIG. 8. The air-conditioning control system 111 communicates a plurality of vehicles including the first vehicle 10 and the second vehicles 20 via a network such as the Internet. The air-conditioning control system 111, similar to the air-conditioning control system 11, includes a processor 111A, a RAM 111B, and a non-volatile memory 111C. The processor 111A executes the air-conditioning control program stored in the non-volatile memory 111C to operate as an information receiver 111E, a vehicle identifier 111F, and an air-conditioning controller 111G as illustrated in FIG. 9, thereby controlling the air conditioner 12 of the first vehicle 10. In this configuration, the information receiver 111E communicates with a plurality of vehicles including the first vehicle 10 and the second vehicles 20 to acquire the position information, as illustrated in FIG. 8. The information receiver 111E then identifies, based on the position information of each vehicle, certain vehicles, which are, in this example, the first vehicle 10 and the second vehicles 20 around the first vehicle 10. The information receiver 111E further acquires, from the second vehicles 20, the drive source information, the position information, the traveling direction information of the second vehicles 20 and, from the first vehicle 10, the position information, the traveling direction information, the vehicle speed information, and the wind direction information of the first vehicle 10. Then, the vehicle identifier 111F and the air-conditioning controller 111G execute the processes in steps S14 to S22 in FIG. 5.

In step S22, the air-conditioning controller 111G communicates with the first vehicle 10 to transmit, to the first vehicle 10, an instruction to control the air conditioner 12 of the first vehicle 10 in the inside air recirculation mode. The first vehicle 10, receiving this instruction, controls the air conditioner 12 in the inside air recirculation mode by the ECU, for example, of the air conditioner 12. The air-conditioning controller 111G thus controls the air conditioner 12 of the first vehicle 10 in the inside air recirculation mode in step S22.

The information receiver 111E may acquire the position information, the traveling direction information, the vehicle speed information, the wind direction information, and the drive source information from all of the plurality of vehicles including the first vehicle 10 and the second vehicles 20, and identify the first vehicle 10 and the second vehicles 20 based on the position information. In this configuration, the information receiver 111E may extract, from the drive source information of all of the vehicles that are already acquired, the drive source information of the identified second vehicles 20, to thereby acquire the drive source information of the second vehicles 20.

The air-conditioning control system 111 enables control of the air conditioner 12 based on the drive source information externally of the first vehicle 10, to thereby reduce the processing burden for controlling the air conditioner 12 within the first vehicle 10.

Various modifications may be made to the above embodiments. For example, the air-conditioning control system 11 may control the outside air introduction mode and the inside air recirculation mode of the air conditioner 12 based on the drive source information from the second vehicles 20 located within a predetermined range around the first vehicle 10 without considering whether or not the first vehicle is traveling or the wind direction information. The air conditioner 12 may be controlled based on the drive source information in any appropriate manner. The air conditioner 12 may be controlled in the inside air recirculation mode when the distance between the first vehicle 10 and the second vehicle 20 measured by a clearance sonar, for example, is small and the drive source information indicates an engine.

The drive source information may indicate the drive source 25 by indicating whether the drive source 25 of the second vehicle 20 is an engine or a non-engine. The drive source information should be stored or managed by any device of the second vehicle 20. The air-conditioning control system 11 may be a single device or may include a plurality of devices that communicate with each other via a network.

According to one example control of the air conditioner 12, the air-conditioning control system 11 may display, before changing the operation of the air conditioner 12, a screen to confirm whether or not the air conditioner 12 may be changed to the inside air recirculation mode or to the outside air introduction mode, via the car navigation system 14, for example. In this configuration, the air-conditioning control system 11 may change the air conditioner 12 to the inside air recirculation mode or to the outside air introduction mode in response to the manipulation of the car navigation system 24, for example, by a passenger of the vehicle to authorize the change, and prevent a change of the air conditioner 12 to the inside air recirculation mode or to the outside air introduction mode in response to denial by the passenger.

The invention claimed is:

1. A vehicle air-conditioning control system, comprising:
an information receiver configured to communicate with at least one second vehicle around a first vehicle, to acquire drive source information of the at least one second vehicle; and
an air-conditioning controller configured to control an air conditioner of the first vehicle in an inside air recirculation mode or in an outside air introduction mode based on the drive source information.

2. The vehicle air-conditioning control system according to claim 1, wherein
the drive source information comprises active drive source information indicating a drive source working in the at least one second vehicle.

3. The vehicle air-conditioning control system according to claim 1, wherein
the drive source information comprises mounted drive source information indicating a drive source mounted in the at least one second vehicle.

4. The vehicle air-conditioning control system according to claim 1, wherein
the air-conditioning controller controls the air conditioner in the inside air recirculation mode in response to the drive source information indicating an engine.

5. The vehicle air-conditioning control system according to claim 1, further comprising:
a vehicle identifier configured to identify the at least one second vehicle located windward of the first vehicle, wherein
the air-conditioning controller controls the air conditioner in the inside air recirculation mode or in the outside air introduction mode, based on the drive source information of the at least one second vehicle located windward of the first vehicle.

6. The vehicle air-conditioning control system according to claim 1, wherein
the at least one second vehicle comprises a plurality of second vehicles, and the information receiver acquires the drive source information from each of the plurality of second vehicles around the first vehicle, and
the air-conditioning controller controls the air conditioner in the inside air recirculation mode or in the outside air introduction mode, in response to the drive source information from each of the plurality of second vehicles satisfying a predetermined criterion.

7. The vehicle air-conditioning control system according to claim 1, wherein
the air-conditioning controller maintains the outside air introduction mode of the air conditioner in response to a defroster in operation and the air conditioner in the outside air introduction mode, in spite of the drive source information indicating an engine.

8. The vehicle air-conditioning control system according to claim 1, wherein
the information receiver acquires the drive source information through vehicle-to-vehicle communication between the first vehicle and the at least one second vehicle.

9. The vehicle air-conditioning control system according to claim 1, wherein
the vehicle air-conditioning control system is disposed external to the first vehicle and the at least one second vehicle, and
the information receiver acquires position information from each of a plurality of vehicles including the first vehicle, identifies a vehicle located around the first vehicle as the at least one second vehicle based on the position information that is acquired, and acquires the drive source information of the at least one second vehicle that is identified.

10. A non-transitory computer-readable storage medium storing a vehicle air-conditioning control program, the vehicle air-conditioning control program causing a processor of a computer to execute operations comprising:
communicating with a second vehicle around a first vehicle to acquire drive source information of the second vehicle; and controlling an air conditioner of the first vehicle in an inside air recirculation mode or in an outside air introduction mode based on the drive source information.

* * * * *

UNITED STATES PATENT AND TRADEMARK OFFICE
CERTIFICATE OF CORRECTION

| | |
|---|---|
| PATENT NO. | : 11,993,244 B2 |
| APPLICATION NO. | : 17/212441 |
| DATED | : May 28, 2024 |
| INVENTOR(S) | : Nishiyama et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 573 days.

Signed and Sealed this
Twenty-sixth Day of August, 2025

Coke Morgan Stewart
*Acting Director of the United States Patent and Trademark Office*